(12) United States Patent
Durocher et al.

(10) Patent No.: US 8,627,015 B2
(45) Date of Patent: Jan. 7, 2014

(54) DATA PROCESSING SYSTEM USING CACHE-AWARE MULTIPATH DISTRIBUTION OF STORAGE COMMANDS AMONG CACHING STORAGE CONTROLLERS

(75) Inventors: Colin D. Durocher, Edmonton (CA); Roel van der Goot, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 934 days.

(21) Appl. No.: 12/533,298

(22) Filed: Jul. 31, 2009

(65) Prior Publication Data
US 2011/0029730 A1  Feb. 3, 2011

(51) Int. Cl.
*G06F 12/00* (2006.01)
(52) U.S. Cl.
USPC ............ 711/141; 711/119; 711/212; 711/213
(58) Field of Classification Search
USPC ................... 711/119, 141, 212, 213
See application file for complete search history.

(56) References Cited

U.S. PATENT DOCUMENTS

| | | | |
|---|---|---|---|
| 6,460,122 B1 | 10/2002 | Otterness et al. | |
| 2005/0283569 A1 | 12/2005 | Mizuno et al. | |
| 2006/0031450 A1 | 2/2006 | Unrau et al. | |
| 2006/0101209 A1* | 5/2006 | Lais et al. | 711/137 |
| 2007/0073972 A1 | 3/2007 | Zohar et al. | |
| 2007/0124407 A1 | 5/2007 | Weber et al. | |
| 2008/0263282 A1* | 10/2008 | Harada et al. | 711/129 |
| 2009/0273566 A1* | 11/2009 | Lu et al. | 345/169 |
| 2009/0300023 A1* | 12/2009 | Vaghani | 707/10 |
| 2010/0153415 A1* | 6/2010 | Muntz | 707/758 |

FOREIGN PATENT DOCUMENTS

| | | |
|---|---|---|
| JP | 2003-99384 A | 4/2003 |
| JP | 2003-162377 A | 6/2003 |
| JP | 2006-164218 A | 6/2006 |
| JP | 2007-188409 A | 7/2007 |

* cited by examiner

*Primary Examiner* — Reginald Bragdon
*Assistant Examiner* — Gurtej Bansal
(74) *Attorney, Agent, or Firm* — BainwoodHuang

(57) ABSTRACT

A data processing system includes a storage system and caching storage controllers coupled to the storage system and to a storage network. The storage controllers operate in an active-active fashion to provide access to volumes of the storage system from any of the storage controllers in response to storage commands from the storage network. The storage controllers employ a distributed cache protocol in which (a) each volume is divided into successive chunks of contiguous blocks, and (b) either chunk ownership may be dynamically transferred among the storage controllers in response to the storage commands, or storage commands sent to a non-owning controller may be forwarded to the owning controller. A multipathing initiator such as a server computer directs the storage commands to the storage controllers by (1) for each volume, maintaining a persistent association of the chunks of the volume with respective storage controllers, and (2) for each storage request directed to a target chunk, identifying the storage controller associated with the target chunk and sending a corresponding storage command to the identified storage controller. Chunk ownership tends to stabilize at individual storage controllers, reducing unnecessary transfer of cache data and metadata among the storage controllers.

23 Claims, 6 Drawing Sheets

DATA PROCESSING SYSTEM USING CACHE-AWARE MULTIPATH DISTRIBUTION OF STORAGE COMMANDS AMONG CACHING STORAGE CONTROLLERS

BACKGROUND

The invention is related to the field of data processing systems employing networked storage.

In the field of data processing, it is known to use so-called networked storage systems in which data storage devices are coupled to host computer systems by storage-oriented networks. The storage-oriented networks may include specialized storage devices such as high-speed switches or routers, as well as specialized storage controllers which provide access to data storage resources (e.g., magnetic disks or other storage media) that are housed in separate storage systems. The networked approach to data storage can provide a number of benefits, including enhanced modularity and scalability.

In networked storage systems, it is typical to provide redundancy for greater availability. Redundancy can be provided by employing multiple independent storage controllers with independent paths to the storage systems housing the storage media. The storage controllers may operate in a so-called active-active fashion such that the storage resources can be accessed via any of the storage controllers at any time, providing both increased performance due to concurrent access as well as improved availability by virtue of the redundancy.

Techniques have been used by which a host computer or other initiator of storage commands selects from among multiple available paths or storage controllers by which a given volume of storage can be accessed. Known techniques have included algorithms for distributing requests among multiple storage controllers by a so-called round-robin method, for example, in which successive storage commands are sent to successive ones of a set of storage controllers. Other techniques have incorporated additional criteria to address performance considerations, such as distributing commands according to a measure of relative loading of multiple available paths/controllers.

It has also been known to employ caching in storage controllers. By use of a relatively high-speed cache along with prefetching, many storage commands can be satisfied out of the cache rather than requiring access to relatively slow storage devices. When caches are employed it is necessary to use a mechanism for maintaining a coherent view of the data stored in the data system from the perspective of all users of the data. A cache coherence protocol is typically employed to move data among multiple caches and to coordinate the access to the data in a coherency-maintaining fashion.

SUMMARY

It is desirable to deploy networked storage systems using sets of active-active storage controllers for their performance and availability benefits, and additionally to employ caching in the storage controllers for the added performance benefit. In such a system it is necessary for a host computer or other initiator of storage commands to selectively direct storage commands to the different storage controllers. However, known path selection techniques employing round-robin or loading-based criteria may result in unnecessary and undesirable data and messaging traffic among the storage controllers to carry out the cache coherence protocol. If storage commands are distributed among caching storage controllers without regard to any address locality of reference, there is a good chance that different requests for data in a given address region are sent to different storage controllers, and in such a case it will be necessary for the data to be transferred from the cache of one controller to the cache of another in the course of processing both requests. Additionally, there may be an unduly increased need for transferring so-called metadata used in carrying out the cache coherence protocol, such as directory data describing which storage controller is responsible for tracking the locations and status of individual data blocks.

In accordance with the present invention, a method and apparatus are disclosed which can provide better performance of networked storage systems using multiple caching storage controllers, by employing path selection criteria that take account of the use of caching by the storage controllers and that seek to minimize the need for transfer of data and metadata among the storage controllers.

A disclosed data processing system includes a storage system providing data storage organized into one or more volumes each consisting of consecutive blocks. A set of caching storage controllers is coupled to the storage system and to a storage network. The caching storage controllers are co-operative in an active-active fashion to provide access to any of the blocks of the volumes from any of the caching storage controllers in response to storage commands received from the storage network. The caching storage controllers engage in a distributed cache protocol according to which (a) each volume is divided into successive chunks each containing a predetermined number of contiguous blocks, and (b) either ownership of the chunks is dynamically transferred among the caching storage controllers in response to the storage commands, or storage commands sent to non-owning controllers are forwarded to owning controllers for processing. In one disclosed embodiment, the cache protocol is a directory-based protocol with multiple hierarchical layers of cache metadata including the chunk ownership metadata.

An initiator such as a server computer is coupled to the storage network and initiates the storage commands in response to storage requests. In one type of embodiment the initiator includes a multipathing driver which is operative in response to storage requests received from a core operating system, which itself may be passing on the storage requests on behalf of one or more applications on a server computer. The initiator performs a method of directing the storage commands to the caching storage controllers which includes (1) for each volume, maintaining a persistent association of the chunks of the volume with respective ones of the caching storage controllers, and (2) for each storage request directed to a target chunk of the volume, (a) identifying the caching storage controller associated with the target chunk, and (b) generating a storage command and sending the storage command via the storage network to the identified caching storage controller.

Because of the persistent association of the chunks with the caching storage controllers, ownership of the chunks tends to stabilize at respective storage controllers rather than move from storage controller to storage controller. The data of the chunk also tends to become stored exclusively in the cache of the storage controller owning the chunk. Thus unnecessary movement of data and metadata is reduced, increasing system performance and efficiency. In one type of embodiment, the persistent association may be created by a process of assigning the chunks to the caching storage controllers which is performed by the initiator upon system initialization for example, and may also be performed in the event of a failure that makes a storage controller and/or path unavailable. In another type of embodiment, the persistent association is created by the storage controllers themselves and communicated to the multitude of initiators that are accessing the storage. The chunks may be assigned, for example, by using a striping technique in which a volume is divided into a number of stripes which are assigned to respective ones of the storage controllers.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
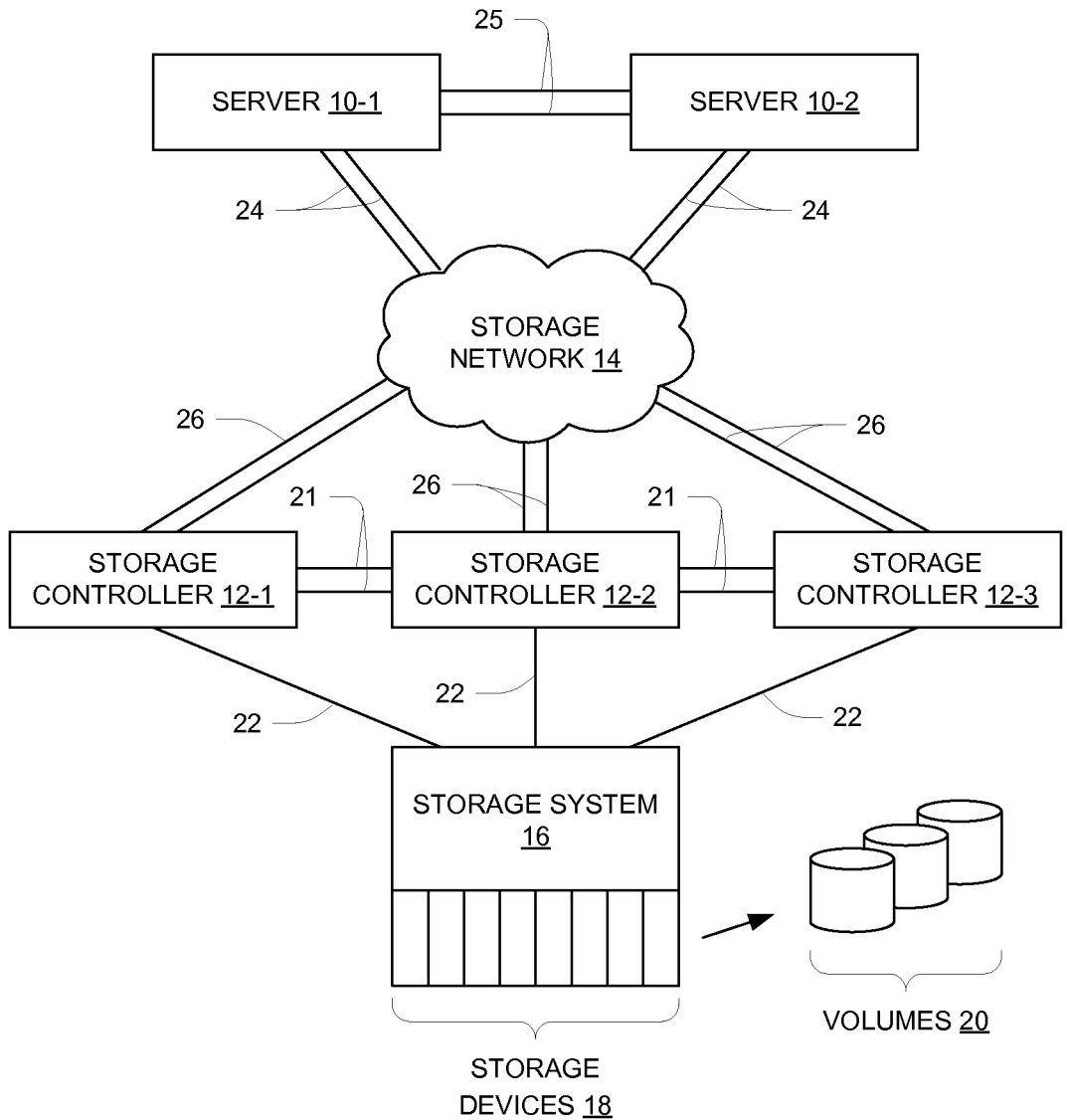
FIG. 1 is a block diagram of a data processing system.

FIG. 1 shows a data processing system in which server computers (servers) 10 and storage controllers 12 are coupled to a storage network 14, and the storage controllers 12 are also coupled to a storage system 16 which contains storage devices 18 such as magnetic disk drives or solid state disks. The storage system 16 provides for data storage and retrieval on the storage devices 18, which may be organized and presented to the storage controllers 12 and servers 10 in the form of logical volumes 20. Communications links (or "links") 21 extend between/among the storage controllers 12, and communications links 22 extend between each of the storage controllers 12 and the storage system 16. The links 21 and 22 are typically storage-oriented links such as Fibre Channel links. The links 21 and 22 may be logically different but could be physically the same. Communications links 24 and 26 between the storage network 14 and the servers 10 and storage controllers 12 respectively, as well as communications links 25 between/among the servers 10, may also be storage-oriented links (such as Fibre Channel), and the storage network 14 may be referred to as a storage-area network (SAN) and include one or more SAN switches. Alternatively, the storage network 14, or the communication links 21, 22 and 25 may be realized using Infiniband or Ethernet technology such as 1/10 GbE links for the links 24 and/or 26, with the storage network 14 employing appropriate Ethernet/Infiniband switching/routing devices. As illustrated, it may be desirable to use two or more links 24 between each server 10 and the storage network 14, and similarly multiple links 26 between the storage network 14 and each storage controller 12, to provide availability-enhancing redundancy as well as to increase overall performance. It will be appreciated that each server 10, storage controller 12 and storage system 16 includes interface circuitry for each link 21,22, 24, 25 or 26 to which it is connected. Each set of link-specific interface circuitry is termed a "port" herein. Thus in FIG. 1, for example, the server 10-1 has two ports for two respective links 24 to the storage network 14.

The storage controllers 12 operate in a so-called "active-active" fashion, meaning that a given set of volumes 20 of the storage system 16 are all accessible through any of the storage controllers 12. This is in contrast to other arrangements which may provide for a "primary" or active controller to serve a given volume and one or more "secondary" or passive controllers which are only used in case of a failure of the primary controller. Because of the active-active operation, each server 10 generally has multiple paths to the storage system 16 to obtain data. In the example system depicted in FIG. 1, each server 10 has twelve paths to the storage system 16 as follows:

(2 links to network 14)*(2 links to each controller 12)*(3 controllers 12)=12 paths Accordingly, one of the tasks for each server 10, and specifically for a multipathing driver on each server 10 (described below), is to distribute its storage commands among the different paths. This aspect of operation is described in detail below.

Additionally, the storage controllers 12 include respective data caches for caching data read from or written to the storage system 16, and utilize a distributed cache protocol for maintaining a coherent view of the data on the volumes 20 from the perspective of any of the servers 10. Pertinent details of the distributed cache protocol and operation are described below. Due to this use of caches, the storage controllers 12 are also referred to herein as "caching storage controllers."

Figure 5A:
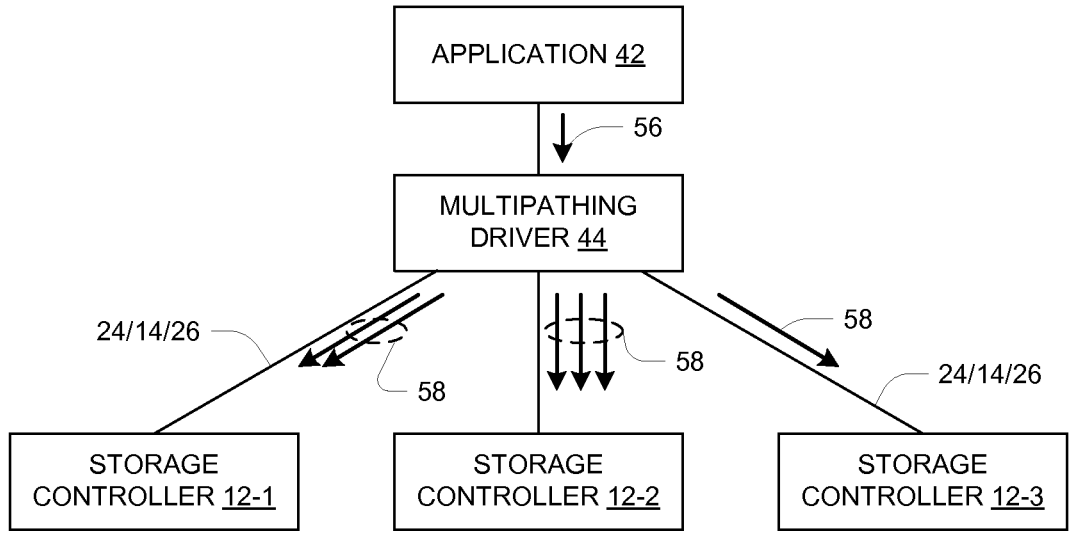
FIGS. 5(a) and 5(b) are schematic representations of multipathing algorithms employed by an initiator such as a server computer.
Figure 5B:
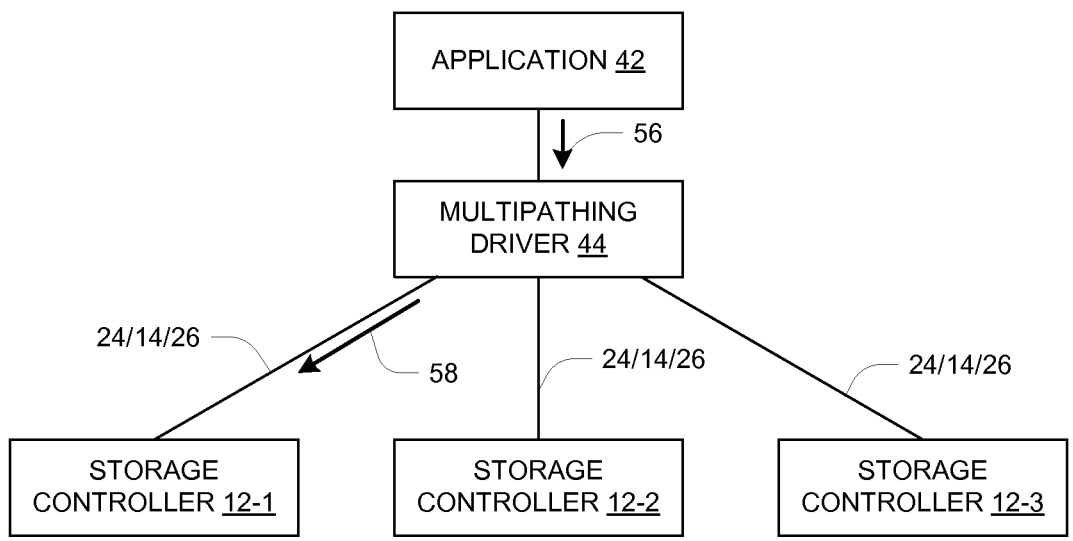

Referring briefly to FIGS. 5(a) and 5(b), it is illustrated that storage commands 58 are sent by a multipathing driver 44 to the storage controllers 12 via the links 24 and 26 as well as storage network 14. The storage commands 58 are generated in response to storage requests 56 from applications 42. More specific information about the applications 42 and multipathing driver 44 is provided below.

In the system of FIG. 1, the servers 10 generate storage commands 58 that are received and processed by the storage controllers 12 and storage system 16. In the parlance of SCSI, the servers 10 function as "initiators" of the storage commands 58. It will be appreciated that in alternative embodiments other kinds of devices that are not necessarily servers may function as initiators and perform certain related functions as described herein. For this reason the term "initiator" is used herein to refer to the source of the storage commands 58 that are received and processed by the storage controllers 12 and storage system 16, and is intended to cover any device which performs such a function.

Briefly, storage commands 58 are processed in the system of FIG. 1 as follows. Storage commands 58 are initiated by the servers 10 and each storage command 58 is sent by the multipathing driver 44 via a given link 24, the storage network 14 and a given link 26 to a storage controller 12 which is responsible for carrying out the command. If the blocks that are the target of the command are not stored in the cache, the storage controller 12 obtains the blocks either from another storage controller 12 or from the storage system 16 if necessary. In the case of a write command, the storage controller need not necessarily obtain the block data, it need only invalidate any existing copies of the block, requiring in some cases communication with one or more of the other storage controllers in the system via link 21. The storage controller 12 then performs the requested operation with respect to the cached blocks, either returning data in the case of reads or accepting the write data in the case of writes. The eventual updating of a storage device 18 with write data may be done in any of a variety of ways as generally known in the art.

Figure 2A:
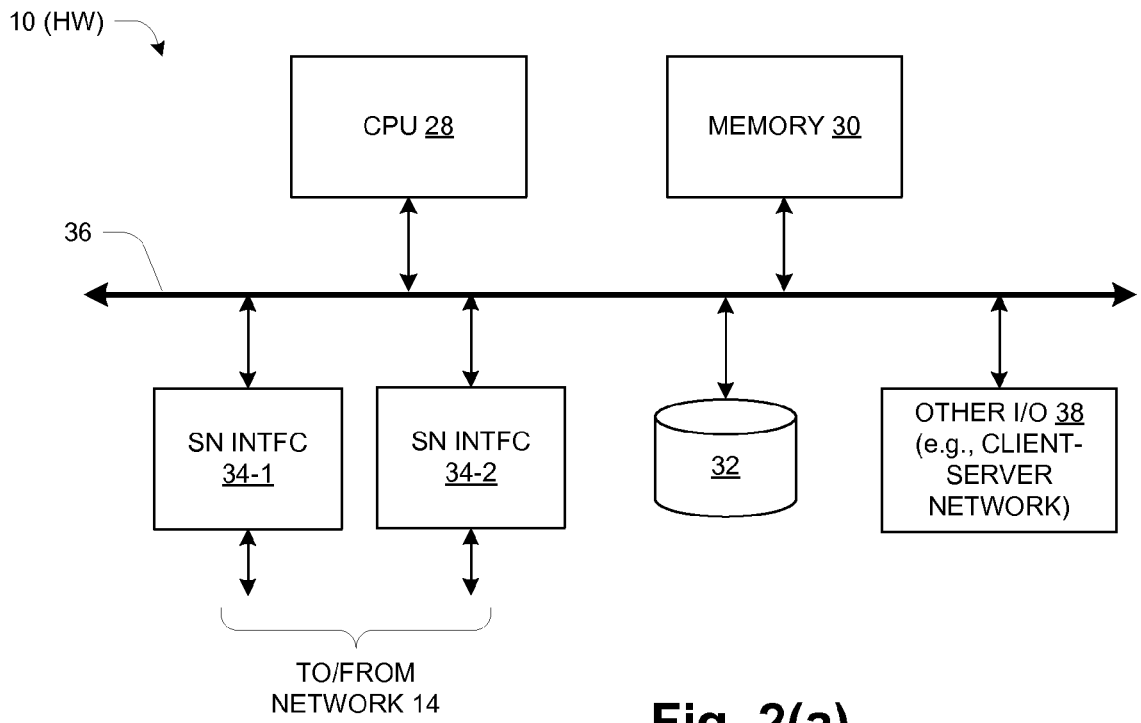
FIG. 2(a) is a block diagram of a server computer from a hardware perspective.
Figure 2B:
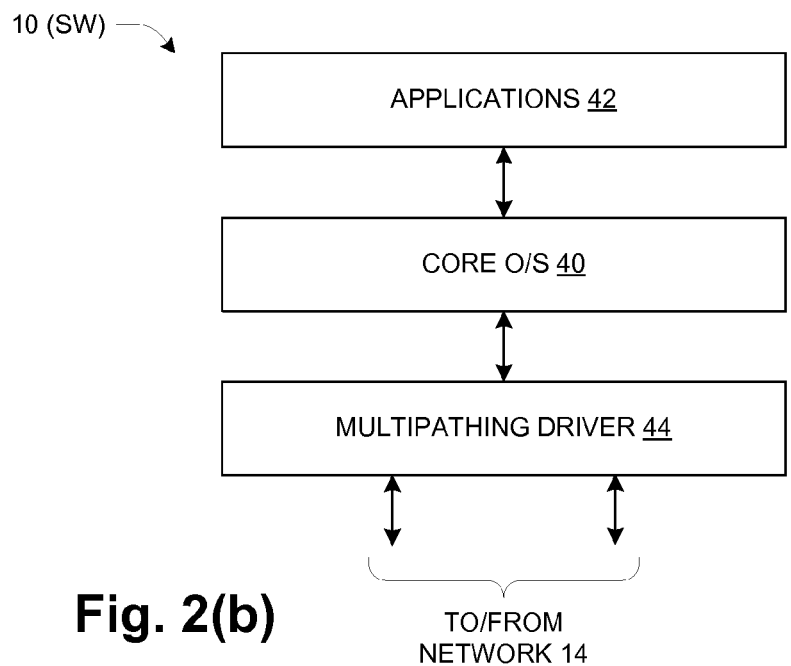
FIG. 2(b) is a block diagram of a server computer from a software perspective.

FIGS. 2(*a*) and 2(*b*) present pertinent hardware (HW) and software (SW) aspects respectively of the servers 10. Referring to the hardware diagram FIG. 2(*a*), a central processing unit (CPU) 28, memory 30, storage 32 and storage network interfaces 34 are all interconnected by interconnect circuitry 36, which may include one or more high-speed data transfer buses as generally known in the art. Storage 32 is for non-volatile local storage of operating system and other files used by the server 10, and typically includes one or more magnetic disks and/or flash memory devices. In operation, programs and data are transferred from the storage 32 into the memory 30, from which the programs are executed and the data is accessed by the CPU 28. The interfaces 34 provide for the transfer of storage commands 58 and data to and from the storage system 16 via the storage network 14 (FIG. 1). The servers 10 will also generally include one or more additional input/output (I/O) interfaces 38 to other devices or ports, for example connections to a separate client-server network (such as a corporate LAN or the Worldwide Web) by which the servers 10 communicate with each other and with client devices that are the ultimate requesters for storage data.

Figure 3A:
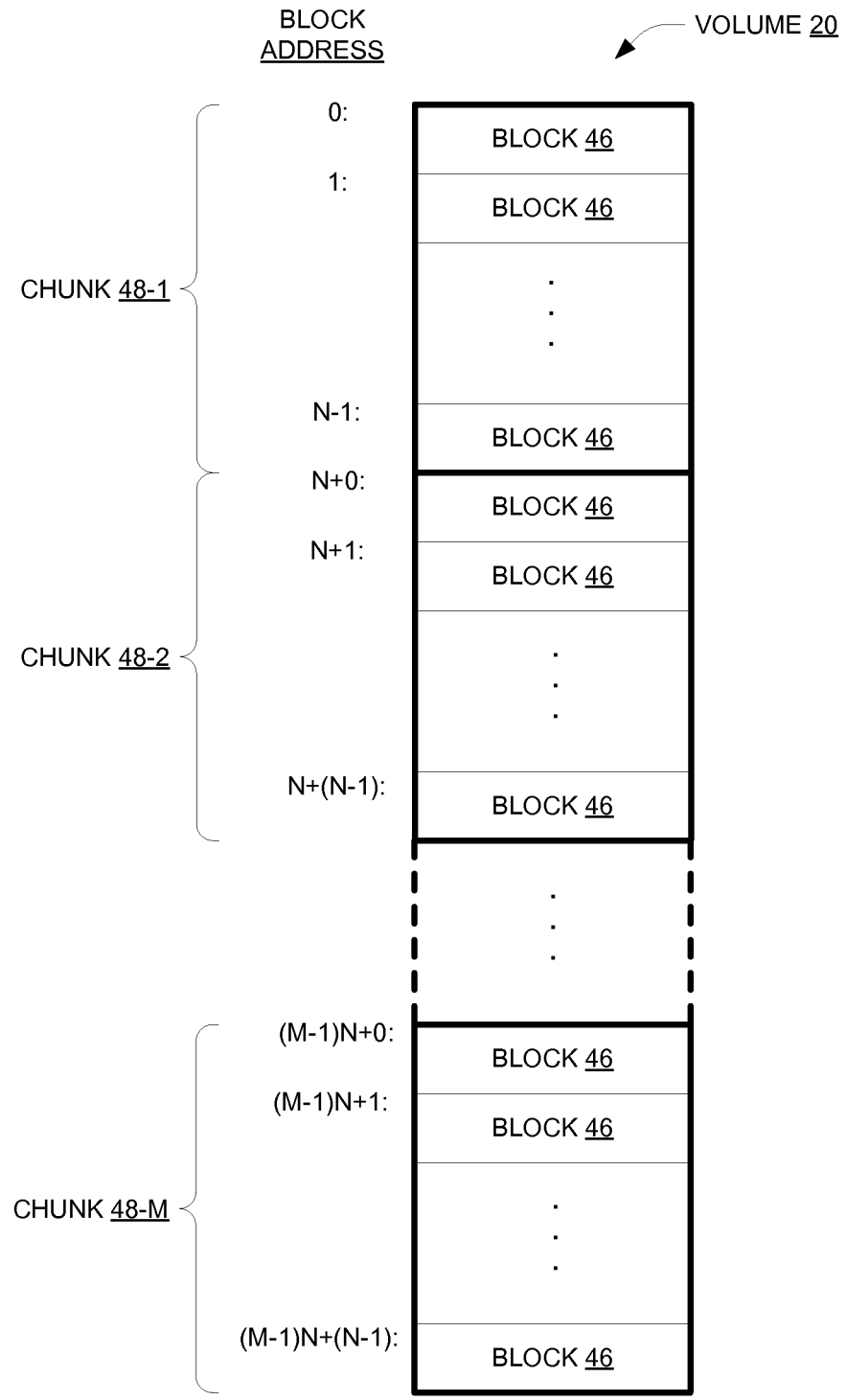
FIGS. 3(a) and 3(b) are schematic representations of organizations of a storage volume into blocks and chunks.
Figure 3B:
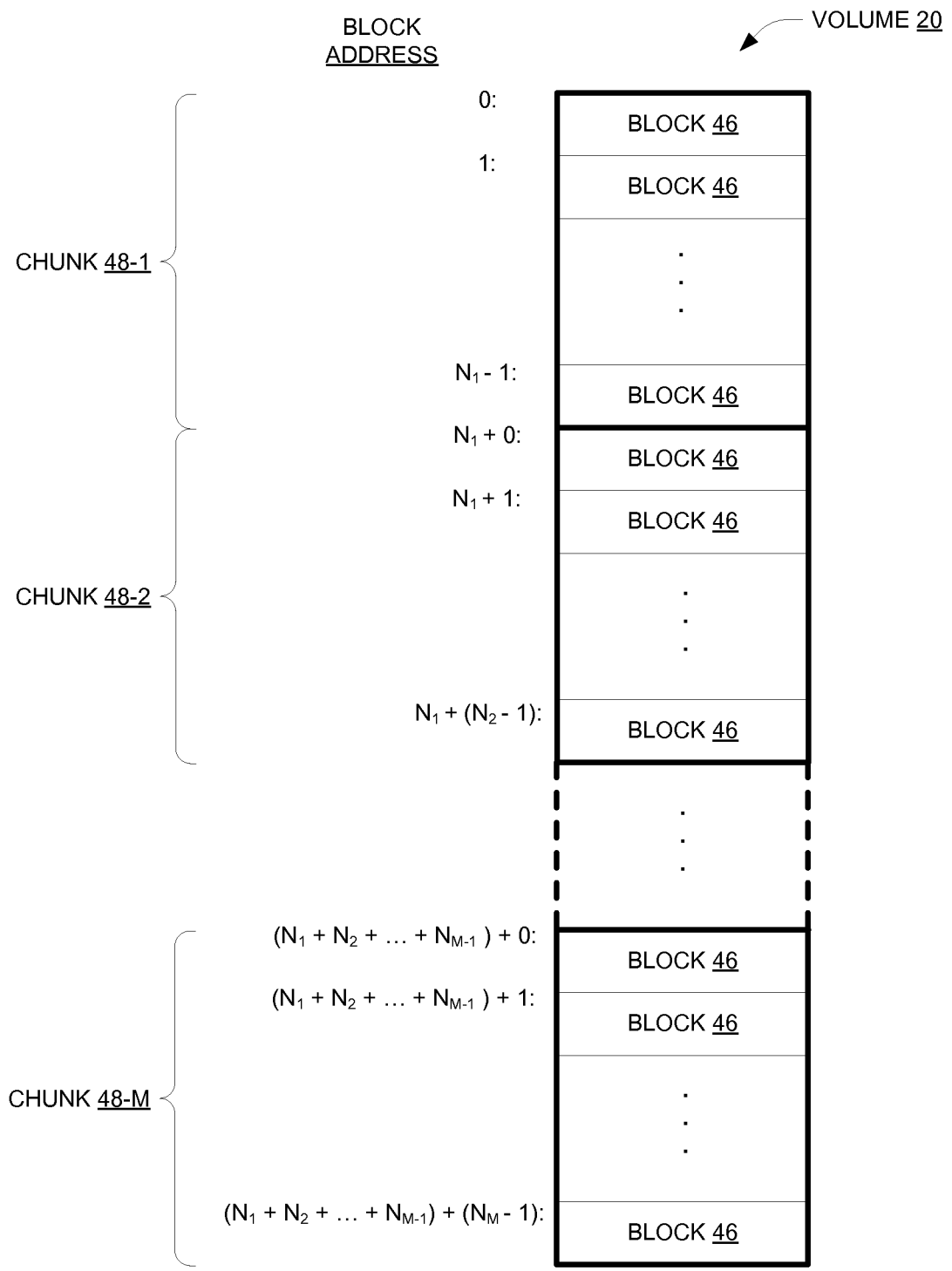

Referring to the server software diagram FIG. 2(*b*), a "core" portion of the operating system (shown as CORE O/S) 40 provides various support functions to applications 42, which may include database applications, Web server applications, etc. The support functions of the core O/S 40 include data storage and retrieval functions which rely on the underlying physical storage provided by the storage system 16 of FIG. 1. The core O/S 40 utilizes a driver 44 which presents the volumes 20 as data storage objects to the core O/S 40 and is responsible for carrying out more detailed operations in response to storage requests 56 (FIGS. 5(*a*) and 5(*b*)) generated by the applications 42, including generating specific storage commands that are sent via the storage network 14 to the storage controllers 12 as well as handling the read or write data associated with the storage commands 58. Additionally, the driver 44 also performs the function of path selection as discussed above, i.e., selecting from among the multiple available paths by which the data of the volumes 20 can be obtained. Specifically, the driver 44 selects which storage controller 12 to send each storage command 58 to, as well as the specific path to be utilized, where "path" refers to a pairing of a specific link 24 and a specific link 26. Because of this aspect of its functionality, the driver 44 is referred to as a "multipathing driver" herein and shown as such in FIGS. 2(*b*), 5(*a*) and 5(*b*). Again, details of the path selection are discussed below. FIGS. 3(*a*) and 3(*b*) show that a volume 20 can be viewed as a linear array of blocks 46 of data, where each block 46 has a generally fixed number of data units in any particular system in operation (although the actual number may be configurable). A block 46 is the addressable unit of storage among the servers 10, storage controllers 12 and storage system 16. Typical block sizes may lie in the range of 512 B to 64 kB for example. The blocks are identified by block addresses, which are shown in an example form in FIGS. 3(*a*) and 3(*b*). A storage command 58 typically is directed to the data in a range of block addresses, often identified by a starting address and a length (number of blocks). A command having a starting block address of N and a length of L, for example, is directed to the range of block addresses N through N+L−1. In the case of a read storage command 58, the data stored at these block addresses is returned to the initiator. In the case of a write storage command 58, the data stored at these block addresses is replaced by the data accompanying the write storage command 58.

Due to the use of caching within the system of FIG. 1, the volume 20 may in some embodiments have additional structure which supports the cache protocol. As shown, this includes the grouping of blocks 46 into "chunks" 48 (shown as 48-1, 48-2, etc.) which in one embodiment are fixed-size groups of consecutive blocks 46. In FIG. 3(*a*) all chunks 48 have the same size and consist of N blocks. In FIG. 3(*b*) the chunks 48-1, 48-2, etc. have potentially different sizes and consist of $N_1$, $N_2$, etc., blocks, respectively, where the Ni may be different values in general. In both FIGS. 3(*a*) and 3(*b*) the volume 20 is shown as having M chunks 48. As with the blocks 46, the size of the chunks 48 is held fixed in operation, but may be a configurable parameter. Chunks 48 are the unit of "ownership" in the cache protocol, as described in more detail below. Generally, it is desirable to make the chunk 48 as large as possible while retaining enough granularity to ensure that both the data access and the work of managing the caching is adequately distributed among the storage controllers 12. An example for the value of M is 4096.

In one embodiment, the cache protocol is a directory-based protocol that has the following components with corresponding functions/attributes:

1) D-Server:
   i) One per system
   ii) Maps volumes 20 to controllers 12 that export them, and assigns the controllers 12 as meta-directory owners for the volumes (one controller 12 per volume 20)
2) Meta-directory owner:
   i) One per volume
   ii) Maps chunks 48 to chunk owners (one controller 12 per chunk 48)
3) Chunk Owner:
   i) One per chunk 48
   ii) Maps blocks of chunk to current block holders (if any)
   iii) Coordinates cache coherency protocol
4) Block Holder:
   i) Presently stores a copy of block 46, which may be exclusive if held for writing
   ii) Can provide copy of data in response to read request
   iii) Invalidates copy in response to write at another block holder The above functional components are provided by the storage controllers 12. For example, the controller 12-1 may be the meta-directory owner for a particular volume 20, which means that it is responsible for maintaining the mapping of chunks 48 of the volume 20 to the chunk owners and providing that information to the other controllers 12 as necessary in operation. Chunk ownership is dynamic based on data access. For example, the first time a block of a previously non-owned chunk is accessed through a particular controller 12, that controller 12 becomes the chunk owner. Ownership is transferred from one controller 12 to another under prescribed conditions, such as when a controller 12 no longer holds any blocks 46 of the chunk 48. In operation, a chunk owner is responsible for knowing which controllers 12 have copies of the blocks 46 of the chunk 48 and for coordinating transfers of data from current block holders to requesting controllers 12 as appropriate.

The distributed cache protocol employs "prefetch"—a sequential set of requests as necessary to enable each storage command 58 to be carried out in cache where possible—avoiding the latency of accessing a storage device 18 of the storage system. Given that the cache meta-data (information regarding block holders, chunk owners, directory owner etc.) is distributed among the storage controllers 12, there is a worst-case situation in which a request must travel to several storage controllers 12 before the requested storage operation can be completed. This worst-case situation occurs when the storage controller 12 that receives a storage command 58 is not the block holder, chunk owner or meta-directory holder for the target volume and data of the volume. In this case the following may occur:

1. The D-server is contacted to identify the meta-directory owner
2. The meta-directory owner is contacted to identify the chunk owner (if any)
3. The chunk owner is contacted to identify the block holder(s) (if any)
4. At least one block holder is contacted to provide the block, and in the case of writes all block holders are contacted to perform a block invalidation It will be appreciated that based on the above protocol, it is very desirable that the data of any particular chunk 48 be accessed mostly/exclusively through only one storage controller 12, to avoid the need for transferring blocks 46 of the chunk 48 as well as the chunk ownership (or any messages regarding the state of chunk ownership) among the storage controllers 12. This goal of promoting a stable distribution of the chunks 48 among the storage controllers 12 is the focus of particular functionality of the initiators/servers 10 as described in more detail below.

Referring briefly back to FIG. 1, in prior systems of the same general type shown in FIG. 1 it has been known to use various multipathing algorithms for distributing the storage commands 58 from a particular server 10 among multiple storage controllers 12. One basic technique is referred to as "round robin", in which successive commands are sent to different storage controllers in a sequence, e.g., commands 1, 2, 3, 4 are sent to storage controllers 12-1, 12-2, 12-3 and 12-1 respectively for example. Variations of the round-robin approach may account for relative loading or delays being experienced on the paths to the different controllers 12 based, for example, on the sizes of respective queues which hold pending storage commands 58, in an attempt to distribute the processing load among the storage controllers 12 and thereby enhance performance and efficiency.

Prior multipathing algorithms make their command routing decisions without knowledge of a cache protocol that may be in use by the storage controllers 12, and thus may actually degrade rather than enhance system performance. Specifically, the command routing decision is made without regard to the block address or chunk to which the command is directed. Storage commands 58 for different blocks 46 of a chunk 48 may be directed to different storage controllers 12, meaning that in many cases the storage controller 12 handling a particular request is not the owner of the chunk(s) 48 in which the target blocks 46 of the storage command 58 reside. In such a case, messaging and data transfer is necessary among the storage controllers 12, decreasing system efficiency and performance.

Figure 4:
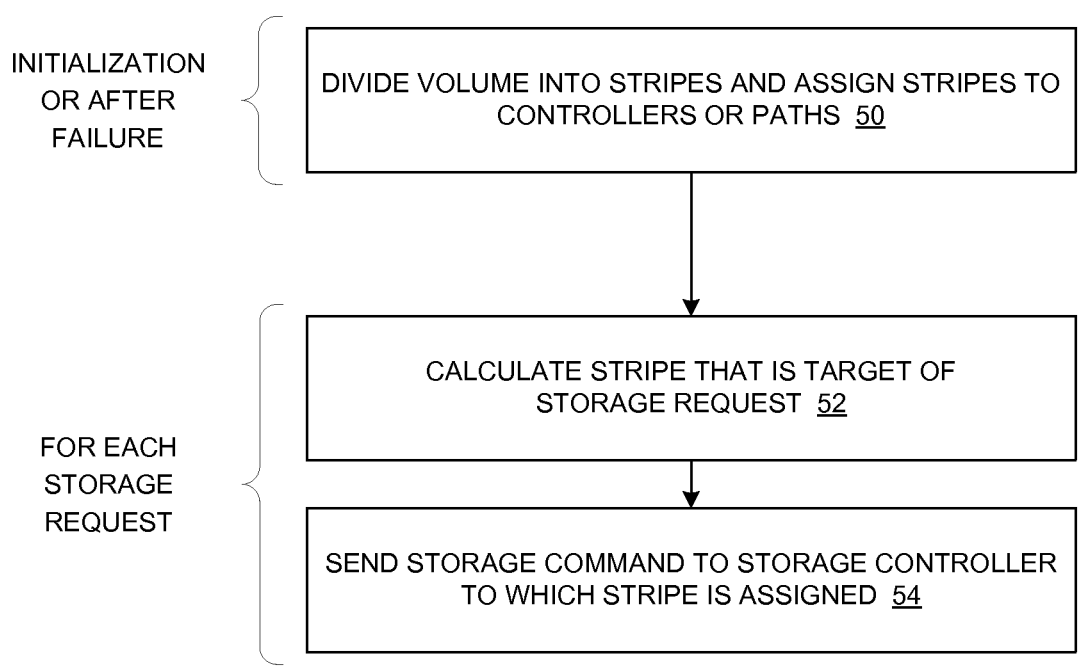
FIG. 4 is a flow diagram of a multipathing algorithm employed by an initiator such as a server computer.

FIG. 4 shows a cache-aware multipathing algorithm employed by the multipathing driver 44 of each server 10 that can achieve better performance when used with caching storage controllers 12, by virtue of incorporating and using information about the cache coherence protocol, making better use of the caching within the storage controllers 12 and thus promoting system efficiency and performance. The method depicted in FIG. 4 is performed on a per-volume basis. The cache-aware multipathing algorithm persistently associates the chunks 48 of the volume 20 with specific storage controllers 12 and then directs storage commands 58 to the storage controllers 12 accordingly, based on the chunks 48 that are the targets of the commands. Chunk ownership tends to stabilize, because most/all of the requests for a given chunk 48 are sent to the same storage controller 12. A storage controller 12 receiving a storage command 58 for a block 46 of a chunk 48 has a high probability of being the owner of the chunk 48, as well as the holders of the blocks 46 of the chunk 48. Thus there is a greatly reduced need for any messaging and data transfer among the storage controllers 12 to satisfy storage commands 58.

Referring now to FIG. 4, a first step 50 is used to form the persistent association between the chunks 48 and the storage controllers 12. Step 50 is performed as part of an initialization or in response to a failure or reconfiguration which results in changes to the number of storage controllers 12 and/or the connectivity a server 10 and the storage controllers 12. In step 50, the volume is divided into "stripes" that correspond to the chunks 48 used by the cache protocol, and the stripes are assigned to either the storage controllers 12 or to specific paths to the storage controllers 12, where each path is a pairing of a specific link 24 and a specific link 26. The stripes are sub-sets of the data of the volume 20 with a granularity at least the size of a chunk 48. For example, assuming a block size of 64 kB and a chunk size of 256 MB (which corresponds to 4096 blocks per chunk), one striping technique may be as follows:

| Block addresses | Chuck address | Stripe | | |
|---|---|---|---|---|
| 0:(4k − 1)   | 0 | 0 | | |
| 4k:(8k − 1)  | 1 |   | 1 | |
| 8k:(12k − 1) | 2 |   |   | 2 |
| 12k:(16k − 1)| 3 |   |   |   | 3 |
| 16k:(20k − 1)| 4 | 0 | | |
| 20k:(24k − 1)| 5 |   | 1 | |
| 24k:(28k − 1)| 6 |   |   | 2 |
| 28k:(32k − 1)| 7 |   |   |   | 3 |
| . | . | . | . | . | . |
| . | . | . | . | . | . |
| . | . | . | . | . | . |

Thus stripe 0, for example, includes chunks 0, 4, 8, . . . , and the other stripes include respective sets of the chunks 48.

It will be appreciated that in the above scheme the stripes are defined by the two least-significant address bits of the chunk address, so the stripe granularity is equal to the chunk size. In general, the stripe granularity can be an integral multiple of the chunk size. Also, in the above scheme the overall volume address space is distributed in a balanced interleaved fashion among the stripes, but this is not essential. Finally, the number of stripes generally corresponds to the number of storage controllers 12, so the above example presumes that there are four storage controllers 12 in the system rather than three as appearing in FIG. 1.

In the second part of step 50, the stripes are assigned to particular storage controllers 12. In a system such as FIG. 1 with three storage controllers 12, it may be convenient to employ three stripes and then assign each one to a different storage controller, i.e., a first stripe to storage controller 12-1, a second to storage controller 12-3 and a third to storage controller 12-3. By this assignment of stripes to storage controllers 12, the chunks 48 also become implicitly associated with specific storage controllers 12 as well. That is, all the chunks 48 residing in a particular stripe implicitly become associated with the same storage controller 12 that the stripe has been assigned to. The association of chunks 48 with storage controllers 12 is the important result—striping is simply one way to accomplish it.

The second set of steps 52 and 54 of the algorithm of FIG. 4 are performed for each individual storage request 56 that is processed by the multipathing driver 44. Here, "storage request 56" refers to a request generated by the application 42 and passed through the core O/S 40 to the multipathing driver 44 to carry out, and which typically results in sending one or more corresponding storage commands 58 to one or more of the storage controllers 12 to either read or write a set of blocks of data in a range of block addresses as identified by address data in each storage command 58. As an example, a storage request 56 may be a request to read a length of 100 blocks of data starting at block address $000050A2_{16}$. The multipathing driver 44 calculates the stripe in which the requested data resides, and then issues a storage command 58 to the storage controller 12 to which the stripe is assigned.

Below is an example of the calculation of the stripe that is the target of a storage request 56.

CONTROLLER-INDEX=ADDRESS/CHUNK_SIZE % NUM-CONTROLLERS where CONTROLLER-INDEX is a numerical identifier of the specific storage controller 12 (e.g., 0 for storage controller 12-1, 1 for storage controller 12-2, etc.), ADDRESS is the address in the storage request 56 and NUM-CONTROLLERS is the number of storage controllers 12 in the system (e.g. three as shown in FIG. 1). The % operator is the modulo operator.

The above can be viewed as a specific heuristic function that can be used to choose a storage controller 12 based on the block address of each storage command 58. This is only one example of many different kinds of heuristic functions that could be used. The general requirement is that the function provide a 1:1 mapping between each chunk 48 and a respective storage controller 12 of the set of storage controllers 12 used in a system and that the mapping be the same for any of a multitude of servers accessing the same blocks of storage. Additionally, it is assumed herein that the multipathing driver 44 (or more generally the initiator 10) is somehow pre-programmed with the function to be used, but in an alternative embodiment the function could be provided to the initiator 10 by a message from the storage system 16 for example. Alternatively, the function could be fetched from some central location accessible to the initiator 10, such as from a file on a shared file system, for instance.

It will be appreciated that some storage requests 56 may be sufficiently large that they occupy regions of two or more separate stripes, and it is desirable to give some consideration to how such requests should be handled. One approach is to break up such large requests into multiple storage commands 58 each directed to the storage controller 12 associated with the corresponding stripe as shown in FIG. 5(a). Another approach which may be simpler is to issue a single storage command 58 to the storage controller 12 associated with the starting address of the storage request 56 as shown in FIG. 5(b), relying on the cache protocol to move the blocks 46 and cache metadata (such as meta-directory and chunk data) as necessary or to forward the command to the storage controller 12 that owns the chunk 48. Although there will be a performance hit for such requests, overall the system should be designed so that such requests are relatively rare and thus do not significantly affect the overall performance of the system. The system design considerations include the chunk size and stripe size as discussed above.

Another scenario to be considered is a reconfiguration which changes the number of available storage controllers 12 and/or the paths between the servers 10 and the storage controllers 12. Such reconfiguration may be the result of a failure for example. Two general approaches can be taken. One is to re-perform step 50 based on the new configuration, which will result in a completely new assignment of stripes to controllers 12 and perhaps even a new striping arrangement. Another approach is to continue using the existing striping and stripe assignments to non-failed controllers/paths while reassigning stripes from any failed path/controller to one or more non-failed paths/controllers. It will be appreciated that such a "fail-over" approach may require that a slightly more complicated calculation be performed in subsequent executions of step 52. For example, if a calculation such as shown above is used, and for a particular storage request 56 it identifies a storage controller 12 which has failed, then perhaps a second-level calculation is performed to identify a non-failed storage controller 12 which should be used instead.

It will be appreciated that in some possible embodiments on this method, the storage controllers themselves could decide on the ownership regions and their distribution between the controllers and communicate the resulting mapping of regions to controllers to the multipathing drivers both at initialization time and after any controller failure.

The above description is focused on an assignment of stripes to storage controllers 12. It will be appreciated that in a case such as shown in FIG. 1 in which a server 10 has multiple paths to any given storage controller 12, the server 10 must make a second-level selection among the paths to the storage controller 12. This can be made using more traditional approaches, e.g., some version of round-robin or other algorithm which may ignore the cache protocol (it is assumed here that each storage controller 12 has a single cache used for all storage commands 58 it receives). If it is desired to avoid such a two-level selection approach, an alternative is to assign stripes to individual paths in the first place (i.e., each stripe is assigned to a specific pairing of a particular link 24 and a particular link 26). It should be noted that although normal operation may thus be simplified somewhat, this scheme may interfere with a fail-over approach to redundancy when a path fails but a storage controller 12 is still reachable on another path. It is of particular concern that as a result of non-symmetric system configuration or as the result of a particular path failure, all servers may not have the same number of healthy paths to storage. When path-based selection is used and a path fails, it may be desirable to re-initialize the stripe assignment etc. (i.e., re-execute step 50 of FIG. 4).

While various embodiments of the invention have been particularly shown and described, it will be understood by those skilled in the art that various changes in form and details may be made therein without departing from the spirit and scope of the invention as defined by the appended claims.

What is claimed is:

1. A data processing system, comprising:
    a storage system operative to provide data storage organized into one or more volumes each consisting of consecutive blocks having respective block addresses;
    a set of caching storage controllers coupled to the storage system and to a storage network, the caching storage controllers being co-operative in an active-active fashion to provide access to any of the blocks of the volumes from any of the caching storage controllers in response to storage commands received from the storage network, the caching storage controllers engaging in a distributed cache protocol according to which (a) each volume is divided into successive chunks each containing a predetermined number of contiguous blocks, and (b) either ownership of the chunks is dynamically transferred among the caching storage controllers in response to the storage commands, or storage commands sent to non-owning controllers are forwarded to owning controllers for processing;

at least one initiator coupled to the storage network and operative to initiate the storage commands in response to storage requests, the initiator being operative to direct the storage commands to the caching storage controllers including:

maintaining a persistent association of the chunks of each volume with respective ones of the caching storage controllers; and for each storage request directed to a target chunk of the volume, (a) identifying the caching storage controller associated with the target chunk, and (b) generating a storage command and sending the storage command via the storage network to the identified caching storage controller, wherein each initiator is a host computer which provides, as the storage commands, multipathing input/output (I/O) requests to the storage system through the storage network, the caching storage controllers residing within the storage network to participate in processing of the multipathing I/O requests;

wherein the storage system houses a set of storage devices constructed and arranged to store host data on behalf of each host computer in a nonvolatile manner;

and wherein the multipathing I/O requests include read requests to read host data from the set of storage devices of the storage system, and write requests to write host data into the set of storage devices of the storage system.

2. A data processing system according to claim 1 wherein:
the initiator is operative to divide each volume into a respective set of interleaved stripes, each stripe having a granularity of at least a chunk and including a respective set of the chunks of the volume;

the persistent association of the chunks with respective ones of the caching storage controllers includes an assignment of the stripes to respective ones of the caching storage controllers; and identifying the caching storage controller associated with the target chunk includes identifying the stripe which includes the target chunk.

3. A data processing system according to claim 1 wherein:
one or more of the storage requests is a large storage request directed to multiple chunks including the respective target chunk, the multiple chunks being associated with respective different ones of the caching storage controllers;

and for each of the large storage requests, the initiator is further operative to perform a large-request operation selected from the group consisting of a single-command operation and a multiple-command operation, the single-command operation including sending one storage command for all the data of the storage request to the caching storage controller associated with the target chunk, the multiple-command operation including generating distinct storage commands for different chunks of the storage request and sending the storage commands to respective ones of the caching storage controllers as associated with the chunks of the storage commands.

4. A data processing system according to claim 1 wherein the initiator is operative to create the persistent association of the chunks of each volume with respective ones of the caching storage controllers at a time of initialization of the data processing system as well as during operation in response to an event which changes the availability of any of the caching storage controllers or respective paths by which the initiator sends the storage commands to the caching storage controllers.

5. A data processing system according to claim 1 wherein:
the data processing system includes multiple paths between the initiator and a particular one of the caching storage controllers; and sending the storage commands to the particular caching storage controller includes selecting one of the multiple paths based on criteria other than the identity of the target chunk.

6. A data processing system according to claim 1 wherein:
maintaining the persistent association of the chunks of each volume with respective ones of the caching storage controllers includes maintaining a persistent association of the chunks of each volume with respective ones of a set of paths in the storage network which connect the initiator to the caching storage controllers; and for each storage request directed to a target chunk of the volume, (a) identifying the caching storage controller includes identifying the path associated with the target chunk, and (b) sending the storage command includes sending the storage command on the identified path.

7. A data processing system according to claim 1, wherein each caching storage controller is coupled to the storage system by a respective communications link, each caching storage controller using its respective communications link to access the blocks of all the volumes in response to the storage commands received from the storage network.

8. A data processing system according to claim 1, wherein each caching storage controller includes a respective data cache for caching data read by the storage controller from the storage system and data to be written by the storage controller to the storage system.

9. A data processing system according to claim 1, wherein:
ownership of the chunks is identified according to a cache directory function providing a dynamic first mapping of the chunks to respective chunk owners;

the chunks are persistently associated with respective ones of the caching storage controllers according to a heuristic function providing a static second mapping between each chunk of each volume and a respective one of the caching storage controllers; and identifying the caching storage controller includes identifying the caching storage controller persistently associated with the target chunk according to the second mapping.

10. A method by which a server computer directs storage commands to caching storage controllers in a data processing system, the data processing system including a storage system operative to provide data storage organized into one or more volumes each consisting of consecutive blocks, the caching storage controllers being coupled to the storage system and to a storage network to which the server computer is also coupled, the caching storage controllers being co-operative in an active-active fashion to provide access to any of the blocks of the volumes from any of the caching storage controllers in response to storage commands received from the storage network, the caching storage controllers engaging in a distributed cache protocol according to which (a) each volume is divided into successive chunks each containing a predetermined number of contiguous blocks, and (b) either ownership of the chunks is dynamically transferred among the caching storage controllers in response to the storage commands, or storage commands sent to non-owning controllers are forwarded to owning controllers for processing, comprising:

maintaining a persistent association of the chunks of each volume with respective ones of the caching storage controllers; and for each storage request directed to a target chunk of the volume, (a) identifying the caching storage controller associated with the target chunk, and (b) generating a storage command and sending the storage command via the storage network to the identified caching storage controller, wherein each initiator is a host computer which provides, as the storage commands, multipathing input/output (I/O) requests to the storage system through the storage network, the caching storage controllers residing within the storage network to participate in processing of the multipathing I/O requests;

wherein the storage system houses a set of storage devices constructed and arranged to store host data on behalf of each host computer in a nonvolatile manner;

and wherein the multipathing I/O requests include read requests to read host data from the set of storage devices of the storage system, and write requests to write host data into the set of storage devices of the storage system.

11. A method according to claim 10 wherein:
the method further includes dividing each volume into a respective set of interleaved stripes, each stripe having a granularity of at least a chunk and including a respective set of the chunks of the volume;
maintaining the persistent association of the chunks with respective ones of the caching storage controllers includes assigning the stripes to respective ones of the caching storage controllers; and
identifying the caching storage controller associated with the target chunk includes identifying the stripe which includes the target chunk.

12. A method according to claim 10 wherein:
one or more of the storage requests is a large storage request directed to multiple chunks including the respective target chunk, the multiple chunks being associated with respective different ones of the caching storage controllers; and
for each of the large storage requests, the method further includes performing a large-request operation selected from the group consisting of a single-command operation and a multiple-command operation, the single-command operation including sending one storage command for all the data of the storage request to the caching storage controller associated with the target chunk, the multiple-command operation including generating distinct storage commands for different chunks of the storage request and sending the storage commands to respective ones of the caching storage controllers as associated with the chunks of the storage commands.

13. A method according to claim 10 further comprising creating the persistent association of the chunks of each volume with respective ones of the caching storage controllers at a time of initialization of the data processing system as well as during operation in response to an event which changes the availability of any of the caching storage controllers or respective paths by which the server computer sends the storage commands to the caching storage controllers.

14. A method according to claim 10 wherein:
the data processing system includes multiple paths between the server computer and a particular one of the caching storage controllers; and
sending the storage commands to the particular caching storage controller includes selecting one of the multiple paths based on criteria other than the identity of the target chunk.

15. A method according to claim 10 wherein:
maintaining the persistent association of the chunks of each volume with respective ones of the caching storage controllers includes maintaining a persistent association of the chunks of each volume with respective ones of a set of paths in the storage network which connect the server computer to the caching storage controllers; and
for each storage request directed to a target chunk of the volume, (a) identifying the caching storage controller includes identifying the path associated with the target chunk, and (b) sending the storage command includes sending the storage command on the identified path.

16. A method according to claim 10, wherein:
ownership of the chunks is identified according to a cache directory function providing a dynamic first mapping of the chunks to respective chunk owners;
the chunks are persistently associated with respective ones of the caching storage controllers according to a heuristic function providing a static second mapping between each chunk of each volume and a respective one of the caching storage controllers; and
identifying the caching storage controller includes identifying the caching storage controller persistently associated with the target chunk according to the second mapping.

17. A server computer for use in a data processing system including a storage system and a set of caching storage controllers, the storage system being operative to provide data storage organized into one or more volumes each consisting of consecutive blocks, the caching storage controllers being coupled to the storage system and to a storage network to which the server computer is also to be coupled, the caching storage controllers being co-operative in an active-active fashion to provide access to any of the blocks of the volumes from any of the caching storage controllers in response to storage commands received from the storage network, the caching storage controllers engaging in a distributed cache protocol according to which (a) each volume is divided into successive chunks each containing a predetermined number of contiguous blocks, and (b) either ownership of the chunks is dynamically transferred among the caching storage controllers in response to the storage commands, or storage commands sent to non-owning controllers are forwarded to owning controllers for processing, comprising:

a processor, memory, and storage network interfaces coupled together by interconnect circuitry, the storage network interfaces being connected to the storage network; and software executable by the processor from the memory for directing storage commands to the caching storage controllers, including:

maintaining a persistent association of the chunks of each volume with respective ones of the caching storage controllers; and for each storage request directed to a target chunk of the volume, (a) identifying the caching storage controller associated with the target chunk, and (b) generating a storage command and sending the storage command via the storage network to the identified caching storage controller, wherein each initiator is a host computer which provides, as the storage commands, multipathing input/output (I/O) requests to the storage system through the storage network, the caching storage controllers residing within the storage network to participate in processing of the multipathing I/O requests;

wherein the storage system houses a set of storage devices constructed and arranged to store host data on behalf of each host computer in a nonvolatile manner;

and wherein the multipathing I/O requests include read requests to read host data from the set of storage devices of the storage system, and write requests to write host data into the set of storage devices of the storage system.

18. A server computer according to claim 17 wherein:

directing the storage commands further includes dividing each volume into a respective set of interleaved stripes, each stripe having a granularity of at least a chunk and including a respective set of the chunks of the volume;

maintaining the persistent association of the chunks with respective ones of the caching storage controllers includes assigning the stripes to respective ones of the caching storage controllers; and identifying the caching storage controller associated with the target chunk includes identifying the stripe which includes the target chunk.

19. A server computer according to claim 17 wherein:

one or more of the storage requests is a large storage request directed to multiple chunks including the respective target chunk, the multiple chunks being associated with respective different ones of the caching storage controllers; and for each of the large storage requests, directing the storage commands further includes performing a large-request operation selected from the group consisting of a single-command operation and a multiple-command operation, the single-command operation including sending one storage command for all the data of the storage request to the caching storage controller associated with the target chunk, the multiple-command operation including generating distinct storage commands for different chunks of the storage request and sending the storage commands to respective ones of the caching storage controllers as associated with the chunks of the storage commands.

20. A server computer according to claim 17 wherein directing the storage commands further includes creating the persistent association of the chunks of each volume with respective ones of the caching storage controllers at a time of initialization of the data processing system as well as during operation in response to an event which changes the availability of any of the caching storage controllers or respective paths by which the server computer sends the storage commands to the caching storage controllers.

21. A server computer according to claim 17 wherein:

the data processing system includes multiple paths between the server computer and a particular one of the caching storage controllers; and sending the storage commands to the particular caching storage controller includes selecting one of the multiple paths based on criteria other than the identity of the target chunk.

22. A server computer according to claim 17 wherein:

maintaining the persistent association of the chunks of each volume with respective ones of the caching storage controllers includes maintaining a persistent association of the chunks of each volume with respective ones of a set of paths in the storage network which connect the server computer to the caching storage controllers; and for each storage request directed to a target chunk of the volume, (a) identifying the caching storage controller includes identifying the path associated with the target chunk, and (b) sending the storage command includes sending the storage command on the identified path.

23. A server computer according to claim 17, wherein:

ownership of the chunks is identified according to a cache directory function providing a dynamic first mapping of the chunks to respective chunk owners;

the chunks are persistently associated with respective ones of the caching storage controllers according to a heuristic function providing a static second mapping between each chunk of each volume and a respective one of the caching storage controllers; and identifying the caching storage controller includes identifying the caching storage controller persistently associated with the target chunk according to the second mapping.

* * * * *